United States Patent
Yuan

(10) Patent No.: US 9,880,591 B2
(45) Date of Patent: Jan. 30, 2018

(54) ELECTRONIC DEVICE AND DISPLAY CONTROL METHOD THEREOF

(71) Applicants: Beijing Lenovo Software Ltd., Haidian District, Beijing (CN); Lenovo (Beijing) Co., Ltd., Haidian District, Beijing (CN)

(72) Inventor: Yang Yuan, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/870,863

(22) Filed: Sep. 30, 2015

(65) Prior Publication Data

US 2016/0363963 A1 Dec. 15, 2016

(30) Foreign Application Priority Data

Jun. 12, 2015 (CN) .......................... 2015 1 0324976

(51) Int. Cl.
  *G06F 3/041* (2006.01)
  *G06F 1/16* (2006.01)
  *G06F 3/00* (2006.01)
  *G06T 3/40* (2006.01)

(52) U.S. Cl.
  CPC ............ *G06F 1/1677* (2013.01); *G06F 3/002* (2013.01); *G06T 3/40* (2013.01)

(58) Field of Classification Search
  CPC ....... G06F 1/1626; G06F 1/1677; G06F 3/041
  USPC ................................ 345/173, 174, 419, 634
  See application file for complete search history.

(56) References Cited

U.S. PATENT DOCUMENTS

| 2015/0115943 A1 | 4/2015 | Jin et al. | |
| 2015/0161970 A1* | 6/2015 | Sunkara | G09G 5/38 345/634 |
| 2015/0268752 A1* | 9/2015 | Ku | G06F 1/1626 345/173 |
| 2015/0365659 A1* | 12/2015 | Han | G06F 1/1677 345/419 |

FOREIGN PATENT DOCUMENTS

| CN | 103488253 A | 1/2014 |
| CN | 103914208 A | 7/2014 |
| CN | 103941977 A | 7/2014 |

OTHER PUBLICATIONS

Office Action, and English language translation thereof, in corresponding Chinese Application No. 201510324976.9, dated Aug. 3, 2017, 14 pages.

\* cited by examiner

*Primary Examiner* — Calvin C Ma
(74) *Attorney, Agent, or Firm* — Brinks Gilson & Lione; G. Peter Nichols

(57) ABSTRACT

An electronic device and a display control method are provided that won't make a user's operation troublesome even if a cover component is arranged in the electronic device so that the user's experience is improved. The display control method includes obtaining a parameter that represents a separation level of a cover component separating from a first surface of the electronic device by one or more sensors arranged in the electronic device; determining first display content to be displayed on a display, according to the parameter; and displaying the first display content by the display.

12 Claims, 3 Drawing Sheets

ELECTRONIC DEVICE AND DISPLAY CONTROL METHOD THEREOF

This application claims priority to Chinese Patent Application No. 201510324976.9 filed Jun. 12, 2015, the entire contents of which are incorporated herein by reference.

BACKGROUND

The present disclosure relates to an electronic device and a display control method thereof.

In an electronic device such as a cell phone, a tablet, a digital camera, or the like, the user equips the electronic device with a cover component such as a protection cover, or the like, to protect a fragile part, such as a display, a back casing, or the like, in the electronic device.

In a case in which the electronic device is equipped with the cover component, a user needs to turn the cover component completely when using the electronic device, so that the display content displayed in the display can be seen by the user. However, when the user only needs to check the time or check whether there is notification information or not, the user still needs to turn over the cover component completely to see the display content, which is troublesome and lowers the user experience.

SUMMARY

The present disclosure is made in view of the above. An object of the present disclosure is to provide an electronic device and a display control method thereof, which won't make the user's operation troublesome even if a cover component is arranged in the electronic device, so that the user experience is improved.

According to an aspect of the present disclosure, an electronic device is provided. The electronic device comprises: a display operative to display content; one or more sensors operative to obtain a parameter which represents a separation level of a cover component separating from a first surface of the electronic device; and a controller operative to determine first display content to be displayed on the display, according to the parameter, and to control the display to display the first display content.

DETAILED DESCRIPTION

Hereinafter the embodiments of the disclosure will be described with reference to the accompany drawings. The description with reference to the accompany drawings hereinafter is provided for a better understanding of the exemplary embodiments of the present disclosure defined by the claims and its equivalents, which includes various details to help the understanding, and should be viewed as exemplary only. Therefore, those skilled in the art should appreciate that various changes and modifications may be made to the embodiments described herein without departing from the scope and the spirit of the present disclosure. Also, in order to make the description clear and simple, the detail description to the known functions and structures in the art will be omitted.

Figure 1:
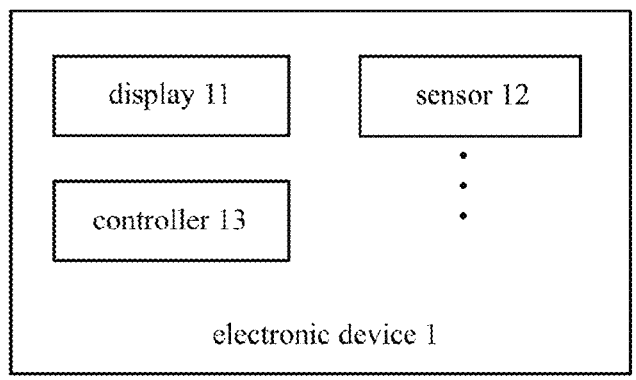
FIG. 1 is a functional block diagram showing an electronic device according to an embodiment of the present disclosure.

An electronic device according to an embodiment of the present disclosure is described with reference to FIG. 1. FIG. 1 is a functional diagram showing an electronic device 1 according to the embodiment of the present disclosure.

As shown in FIG. 1, the electronic device 1 according to the embodiment of the present disclosure comprises a display 11, one or more sensors 12 and a controller 13. The electronic device 1 according to the embodiment of the present disclosure may be a cell phone, a digital camera, a tablet, or the like, which is not limited thereto, as long as a cover component and a display can be arranged.

The display 11 is operative to display content. Particularly, the display 11 can display one or more icons in a display region. In a normal case, the display 11 displays the display content in a whole displayable region of the display 11. However, as described later, the display content can be displayed in part of the displayable region depending on situation. In addition, in the embodiment of the present disclosure, the display manner of the location, the size, or the like of the displayed one or more icons may be controlled depending on situation.

The sensor 12 is operative to obtain a parameter which represents a separation level of a cover component separating from a first surface of the electronic device. In the embodiment of the present disclosure, multiple sensors 12 may be arranged, or only one sensor 12 comprising multiple sensing units or capable of sensing information on multiple locations, may be arranged.

Particularly, the sensor 12 may detect the separation level of the cover component separating from the front surface in which the display is arranged, of the electronic device 1, to obtain the parameter. At this time, the parameter obtained by the sensor 12 indicates the separation level of the cover component separating from the front surface of the electronic device 1. In addition, it is also possible for the sensor 12 to detect the separation level of the cover component separating from the back surface opposite to the front surface, of the electronic device 1, to obtain the parameter. At this time, the parameter obtained by the sensor 12 indicates the separation level of the cover component separating from the back surface of the electronic device 1.

The cover component is, for example, a peripheral attachment such as a protection cover, or the like. Alternatively, the electronic device itself comprises the cover component, for example, the keyboard, the support plate, or the like.

Particularly, the sensor 12 is made of, for example, a Hall sensor. In the cover component, a magnet is arranged at a location corresponding to the location where the Hall sensor is arranged, so that the Hall sensor can detect whether the distance to the cover component is within a preset distance. By detecting whether the distance from the first surface of the electronic device to the cover component is within the preset distance at different locations by one or more sensors 12, the separation level of the cover component separating from the first surface of the electronic device may be determined according to the parameter at different locations.

Figure 2:
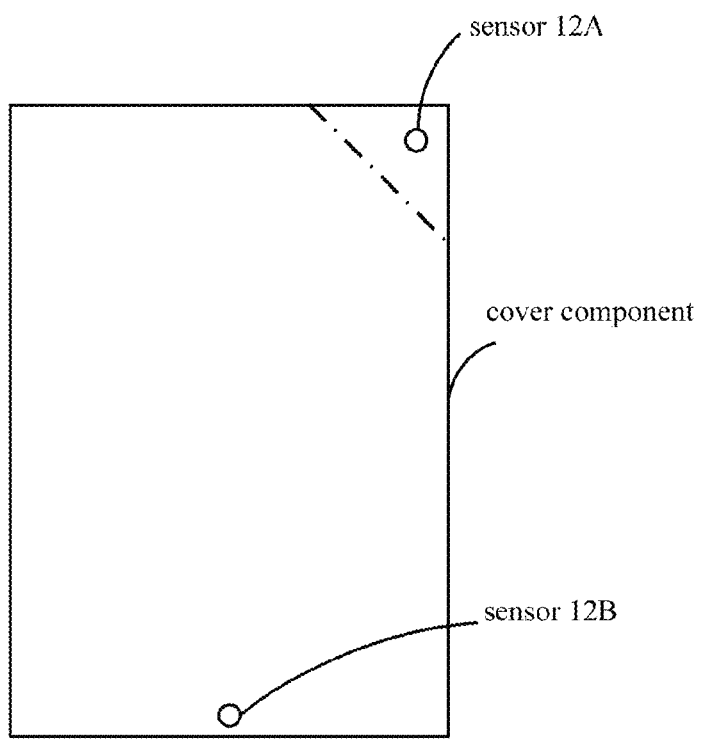
FIG. 2 is a diagram exemplifying a configuration of a sensor according to an embodiment of the present disclosure.

FIG. 2 is a diagram exemplifying a configuration of the sensor according to the embodiment of the present disclosure. As shown in FIG. 2, the sensor 12A and the sensor 12B detect the separation level of the cover component separating from the front surface of the electronic device 1 in which the display is arranged. Particularly, in a case in which the sensor 12A and the sensor 12B detect that the distance from the cover component to the display 11 is within a predetermined distance, according to the parameter obtained by the sensor 12A and the sensor 12B, it may be determined that the cover component is not opened. In addition, in a case in which the sensor 12A does not detect that the distance from the cover component to the display 11 is within the predetermined distance and the sensor 12B detects that the distance from the cover component to the display 11 is within the predetermined distance, according to the parameter obtained by the sensor 12A and the sensor 12B, it may be determined that the upper right cover of the cover component is opened. In addition, in a case in which the sensor 12A and the sensor 12B do not detect that the distance from the cover component to the display 11 is within a predetermined distance, according to the parameter obtained by the sensor 12A and the sensor 12B, it may be determined that the cover component is opened completely.

The sensor 12 may be formed of other components, such as a camera, a distance sensor, an ambient light sensor, or the like. The construction of the sensor 12 is not limited thereto, as long as the separation level of the cover component separating from the first surface (the front surface or the back surface) of the electronic device can be detected. For example, in a case in which the sensor 12 is formed of the camera, it is determined whether the distance from the cover component to the first surface of the electronic device is within the predetermined distance according to the brightness of the image photographed by the camera, so that the separation level of the cover component separating from the first surface of the electronic device is detected. In addition, in a case in which the sensor 12 is formed of the distance sensor, the separation level of the cover component separating from the first surface of the electronic device is detected according to the distance from the cover component to the first surface of the electronic device which is detected by the distance sensor.

In addition, in the diagram shown in FIG. 2, an example in which two sensors 12 are arranged is illustrated, however, more sensors 12 may be arranged according to requirement. In addition, it is also possible to arrange only one sensor 12, for example comprising multiple sensing units or capable of detecting multiple location information, and it is detected whether the distance from the cover component to the display 11 is within the predetermined distance at various locations of the cover component by the single sensor 12. Thereby, the separation level of the cover component separating from the first surface of the electronic device may be detected by a single sensor.

The controller 13 determines first display content to be displayed on the display 11, according to the parameter, and controls the display 11 to display the first display content. Particularly, the controller 13 may determine the separation level of the cover component separating from the first surface of the electronic device according to the parameter obtained by the sensor 12, so as to determine the first display content to be displayed on the display 11, corresponding to the separation level of the cover component separating from the first surface of the electronic device.

Figure 3:
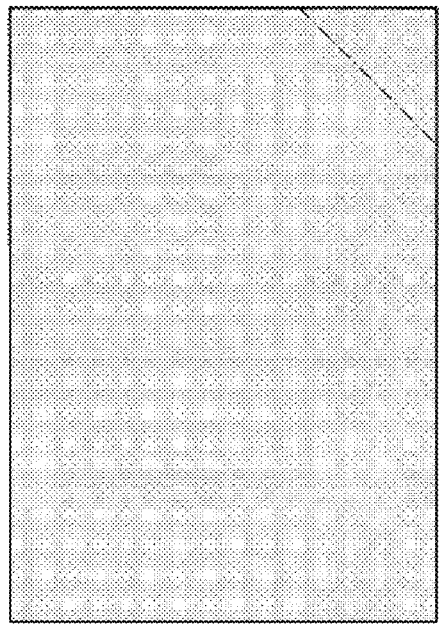
FIG. 3 is a diagram exemplifying display content of a display according to an embodiment of the present disclosure.
Figure 3:
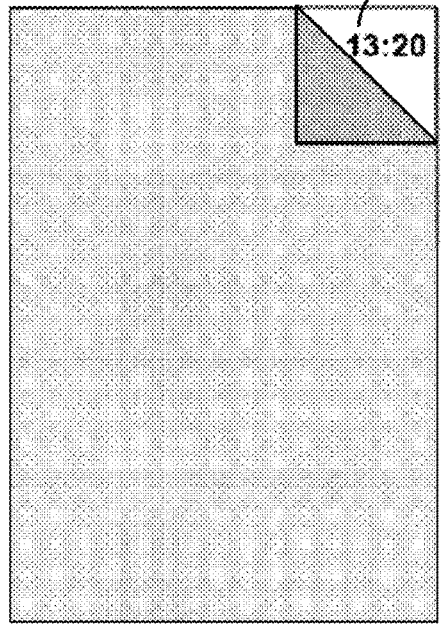
Figure 3:
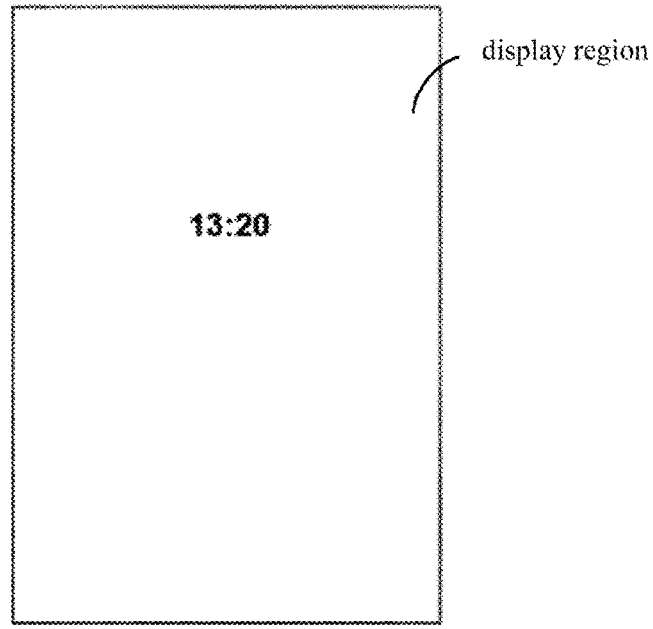

FIG. 3 is a diagram exemplifying the display content of the display according to the embodiment of the present disclosure. In the diagram shown in FIG. 3, the display content to be displayed on the display 11 is controlled according to the parameter obtained by the sensor 12A and 12B arranged as shown in FIG. 2.

As described above, in FIG. 2, the sensor 12A and the sensor 12B detect the separation level of the cover component separating from the front surface in which the display is arranged, of the electronic device 1. Particularly, the parameter A obtained by the sensor 12A indicates whether the distance from the cover component to the display 11 is within the predetermined distance at the locations that can be detected by the sensor 12A. Similarly, the parameter B obtained by the sensor 12B indicates whether the distance from the cover component to the display 11 is within the predetermined distance at the locations that can be detected by the sensor 12B.

Optionally, the controller 13 determines a display region of the display 11, according to the parameter obtained by the sensor 12A and 12B. For example, in a case in which the parameter A and the parameter B indicate that the distance from the cover component to the display 11 is within the predetermined distance, it is determined that the cover component is not opened. At this time, as shown in FIG. 3, the display region of the display 11 is not set. In addition, in a case in which the parameter A indicates that the distance from the cover component to the display 11 is not within the predetermined distance and the parameter B indicate that the distance from the cover component to the display 11 is within the predetermined distance, the controller 13 determines that the upper right corner of the cover component is opened. At this time, as shown in FIG. 3, the display region of the display 11 is set to the upper right corner and corresponds to the location where the cover component is opened, so that the user can see the display region. In addition, in a case in which the parameter A and the parameter B indicate that the distance from the cover component to the display 11 is not within the predetermined distance, the controller 13 determines that the cover component is opened completely. At this time, as shown in FIG. 3, the display region of the display 13 is determined to be the whole displayable region of the display 11. Since the display is done only at the determined display region, the power consumption of the display 11 can be decreased.

Optionally, the controller 13 determines the first display content to be displayed on the display 11, based on the determined display region. Particularly, the controller 13 determines a display object contained in the first display content to be displayed on the display 11, a location and a size of the display object, according to an area and a location of the determined display region. As described above, the display content is displayed in the display 11 which includes one or more display objects, and the controller can also control the display manner of the display object, such as the location, the size, or the like. Therefore, the controller 13 can determine the first display content corresponding to the area and the location of the display region, by controlling the display object included in the first display content displayed on the display 11, the location and the size of the display object.

For example, as shown in FIG. 3, in a case in which the display region of the display 11 is set to be at the upper right corner and corresponds to the location where the cover component is opened, since the area of the display region is small, the controller 13 only sets one display object, that is, an icon indicating the time. In addition, since the display region is at the upper right corner of the display unit, in order to make sure that the user can see with his/her eyes, the location of the display object is set to be the location where the cover component is opened. In addition, the controller can set the size of the display object included in the first display content properly, according to the area of the display region, so as to facilitate the user to check. For example, when the size of the display object is set to be too small, it is difficult for the user to see the information indicated by the object, such as the time or the like, with his/her eyes. When the size of the display object is set to be too large, the range of the display object comprised in the first display content may go beyond the display region, so that the display object cannot be displayed as a whole in the display region.

Referring to FIG. 3, in a case in which the display region of the display 11 is determined to be the whole displayable region of the display 11, the controller 13 can set the number of display objects contained in the first display content according to the area of the display region. In FIG. 3, one display object is shown, but optionally more display objects are shown in order to display more information. In addition, the controller 13 sets the display object included in the first display content to be at the middle location of the whole displayable region according to the location of the display region.

In addition, in a case in which the sensor 12 is formed of other component so that other parameter is detected, for example, the distance from the front surface of the electronic device to the cover component which is detected by the distance sensor, the first display content can be determined according to the parameter. Particularly, as described above, the display region, the number of the display objects included, the location and the size of the display objects, or the like may be also determined according to the detected other parameter, so that the first display content is determined corresponding to the separation level of the cover component separating from the first surface of the electronic device.

In addition, in a case in which one sensor 12 comprising multiple sensing units or capable of sensing multiple location information is arranged, parameters at different locations can be also detected. Therefore, the controller 13 may control the first display content properly according to the parameter obtained by the single sensor 12.

In addition, in the example shown in FIGS. 2 and 3, it is shown that the separation level of the cover component separating from the front surface of the electronic device is detected by the sensor 12, and the controller 13 determines the first display content to be displayed on the display 11 according to the parameter obtained by the sensor 12. However, in the embodiment of the present disclosure, the sensor 12 may also detect the separation level of the cover component separating from the back surface of the electronic device to obtain the parameter. For example, the cover component is a cover component covering the back casing, for example, the keyboard, the support plate, or the like. The sensor 12 is operative to detect the separation level of the cover component separating from the back surface of the electronic device to obtain the parameter. At this time, the parameter indicates, for example, whether the distance from the cover component to the back casing of the electronic device is within the predetermined distance, or the distance from the cover component to the back casing of the electronic device.

In a case in which the sensor 12 detects the separation level of the cover component separating from the back surface of the electronic device, the controller determines the first display content to be displayed on the display 11 according to the parameter. At this time, optionally, the interactive content is displayed by the display 11 according to the separation level of the cover component separating from the back surface of the electronic device. For example, in a case in which the keyboard covering the back casing is attached to the back casing of the electronic device completely, a mark for indicating the attachment is displayed on the display 11. In addition, in a case in which the keyboard is detached from the back casing of the electronic device, a mark for showing the keyboard being detached from the back casing is displayed on the display 11 to alert the user. For another example, in a case in which the cover component is formed of a support plate, the relative angel between the support plate and the back casing of the electronic device is computed according to the parameter of the sensor 12 so that the display 11 displays the relative angle.

The examples in which the first display content is controlled according to the separation level of the cover component separating from the back surface of the electronic device is not limited thereto, and arbitrary information can be displayed as long as the user experience can be improved. For example, it is also possible to display the interactive information on the display 11 according to the separation level of the cover component separating from the back surface of the electronic device. For example, in a case in which the keyboard is detached from the back casing of the electronic device, weather information is displayed on the display 11. Then, if the user wants to check the weather information, he/she only needs to detach the keyboard from the back casing and the user experience is improved.

In the example in FIG. 2, the separation level of the cover component separating from the first surface of the electronic device is determined according to the parameter of two sensors 12, and three states, the upper right corner being opened, not opened, completely opened, can be detected. In order to improve the detection accuracy of the separation level of the cover component separating from the first surface of the electronic device, optionally, more sensors 12 are arranged.

Figure 4:
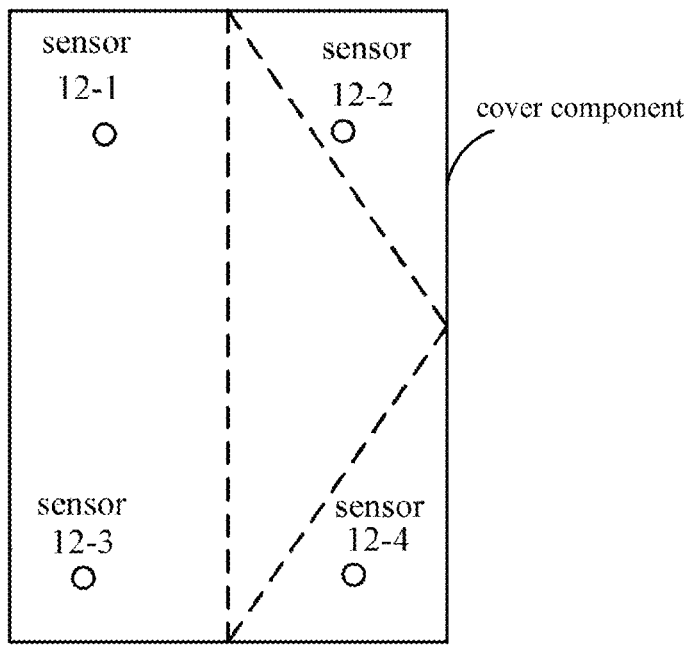
FIG. 4 is a diagram exemplifying a configuration of a sensor according to an embodiment of the present disclosure.

FIG. 4 is a diagram exemplifying a configuration of sensors according to the embodiment of the present disclosure. In FIG. 4, four sensors, the sensor 12-1, the sensor 12-2, the sensor 12-3 and the sensor 12-4 are arranged, therefore, more states, for example, the upper right corner being opened, the lower right corner being opened, the right half part opened, completely opened, or the like, about the separation level of the cover component separating from the first surface of the electronic device can be detected. Since the separation level of the cover component separating from the first surface of the electronic device can be determined more accurately, correspondingly, the first display content to be displayed on the display 11 can be controlled more properly according to the parameter. However, with the increasing of the number of the sensors 12, the power consumption is increased too, and the processes for processing the parameter obtained by the sensor 12 are increased as well.

In the embodiment of the present disclosure, in a case in which the sensor 12 detects the separation level of the cover component separating from the first surface of the electronic device and the controller determines the display region according to the parameter, optionally, the multiple sensors 12 are divided into at least two groups of sensors, and the at least two groups of sensors are given different priorities. Particularly, the controller 13 initialize the current priority to be the highest priority, and determines the display region of the display 11, using the parameter generated by sensors in a group of sensors 12 with a priority higher than or equal to the current priority. If the display region of the display 11 cannot be determined, the controller 13 repeats the following process until the display region of the display 11 can be determined: decreasing the current priority, and determining the display region of the display 11, using the parameter generated by sensors 12 in a group of sensors with a priority higher than or equal to the decreased current priority.

For example, in a case in which the cover component is formed of a protection cover, normally, the left side of the protection cover is connected with the electronic device so that the protection cover cannot be opened from the left side. Of course, according to the user's habits, the protection cover may also be formed so as not to be opened from the upper side or the right side. In FIG. 4, the sensors 12-2 and 12-4 are divided into a group of sensors with the high priority, and the sensors 12-1 and 12-3 are divided into a group of sensors with the low priority. Of course, with the increasing of the number of the sensors, or different application scenarios, the sensors may be divided properly into more groups, and more priorities may be given to the sensors.

At this time, firstly, the controller 13 determines the display region of the display 11 according to the parameter obtained by the sensor 12 in the group of sensors with the high priority. If the sensors 12-2 and 12-44 in the group of sensors with the high priority detect that the distance from the cover component to the display 11 is within the predetermined distance, it may be considered as the cover component not being opened, and no display region is set. If the sensor 12-2 detects that the distance from the cover component to the display 11 is within the predetermined distance, in a case that the sensor 12-4 does not detect that the distance from the cover component to the display 11 is within the predetermined distance, it may be determined that the lower right corner of the cover component is opened, and the display region is set to be at the lower right corner. Similarly, if the sensor 12-2 does not detect that the distance from the cover component to the display 11 is within the predetermined distance, and the sensor 12-4 detects that the distance from the cover component to the display 11 is within the predetermined distance, it may be determined that the upper right corner is opened, and the display region is set to be at the upper right corner.

However, if the sensors 12-2 and 12-4 in the group of sensors with the high priority do not detect that the distance from the cover component to the display 11 is within the predetermined distance, the controller 13 cannot determine whether the right half part of the cover component is opened or the cover component is completely opened. At this time, the controller 13 also uses the parameter obtained by the sensor 12 in the group of sensors with the high priority to determine the display region of the display unit 11. If the sensors 12-2 and 12-4 in the group of sensors with the high priority do not detect that the distance from the cover component to the display 11 is within the predetermined distance, when the sensor 12-1 or 12-3 in the group of sensors with the low priority detects that the distance from the cover component to the display 11 is within the predetermined distance, it may be determined that the right half part of the cover component is opened, so that the display region is set to be the right half part of the display 11. In addition, if the sensors 12-2 and 12-4 in the group of sensors with the high priority do not detect that the distance from the cover component to the display 11 is within the predetermined distance, when the sensors 12-1 and 12-3 in the group of sensors with the low priority do not detect that the distance from the cover component to the display 11 is within the predetermined distance, it may be determined that the cover component is opened completely, so that the display region is set to be the whole displayable region of the display 11.

Therefore, in the embodiment of the present disclosure, in a normal mode, the sensors 12-1 and 12-3 may be turned off. When the sensors 12-2 and 12-4 in the group of sensors with the high priority do not detect that the distance from the cover component to the display 11 is within the predetermined distance, the sensors 12-1 and 12-3 are turned on to obtain the parameter, thereby the power consumption can be saved. Also, in the normal mode, the display region is determined only using the parameter obtained by the sensors 12-2 and 12-4 in the group of sensors with the high priority, the detected information amount is decreased and the process for determining the display region becomes simple.

In addition, in a case in which more sensors are arranged so that they are divided into groups of sensors with more than three different priorities, if the display region of the display 11 cannot be determined, the controller 13 repeats the following process until the display region of the display 11 can be determined: decreasing the current priority, and determining the display region of the display 11, using the parameter generated by sensors 12 in a group of sensors with a priority higher than or equal to the decreased current priority.

With the electronic device according to the present disclosure, the sensor for detecting the separation level of the cover component, such as the protection cover, or the like, separating from the first surface of the electronic device, generates the parameter, and the controller 13 determines the display content to be displayed on the display 11 based on the parameter. Thereby, even if the cover attachment is arranged in the electronic device 1, the user's operation won't become troublesome, and the user experience is improved. For example, when the user wants to check the time or check whether there is the notification information or not, since the case in which a corner of the protection cover covering the display 11 is turned over can be detected and the time or the notification information can be displayed at the corresponding corner based on such case, the user only needs to uncover the corner of the protection cover. In addition, for example, in a case in which the keyboard covering the back casing is attached to the back casing of the electronic device, the mark for indicating the attachment is displayed on the display 11. When the keyboard is detached from the back casing of the electronic device, the mark indicating the keyboard being detached from the back casing is displayed on the display 11 to alert the user, so that the user experience is improved.

Figure 5:
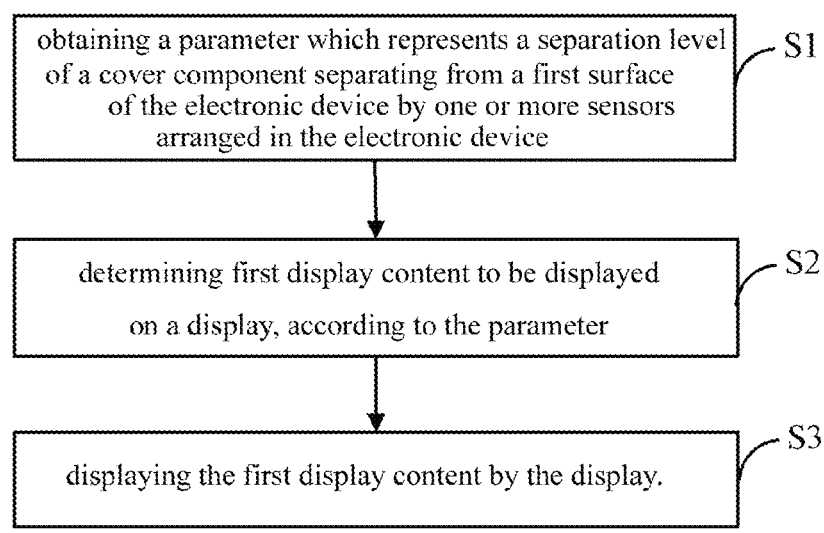
FIG. 5 is a flowchart showing a display control method according to an embodiment of the present disclosure.

Hereinafter, the display control method according to an embodiment of the present disclosure will be described with reference to FIG. 5. FIG. 5 is a flowchart showing a display control method according to an embodiment of the present disclosure.

The display control method shown in FIG. 5 may be applied to the electronic device 1 shown in FIG. 1. As shown in FIG. 1, the electronic device 1 according to the embodiment of the present disclosure comprises a display 11, one or more sensors 12 and a controller 13. The electronic device 1 according to the embodiment of the present disclosure may be a cell phone, a digital camera, a tablet, or the like, which is not limited thereto, as long as a cover component and a display can be arranged. The cover component is, for example, a peripheral attachment such as a protection cover, or the like. Alternatively, the electronic device itself comprises the cover component, for example, the keyboard, the support plate, or the like.

In Step S1, a parameter which represents a separation level of a cover component separating from a first surface of the electronic device is obtained, by one or more sensors arranged in the electronic device.

Particularly, in the electronic device 1, multiple sensors 12 may be arranged, or only one sensor 12 comprising multiple sensing units or capable of sensing information on multiple locations, may be arranged. For example, the sensor 12 may detect the separation level of the cover component separating from the front surface in which the display is arranged, of the electronic device, to obtain the parameter. At this time, the parameter obtained by the sensor 12 indicates the separation level of the cover component separating from the front surface of the electronic device 1. In addition, it is also possible for the sensor 12 to detect the separation level of the cover component separating from the back surface opposite to the front surface, of the electronic device, to obtain the parameter. At this time, the parameter obtained by the sensor 12 indicates the separation level of the cover component separating from the back surface of the electronic device 1.

For example, the sensor 12 is made of, for example, a Hall sensor. In the cover component, a magnet is arranged at a location corresponding to the location where the Hall sensor is arranged, so that the Hall sensor can detect whether the distance to the cover component is within a preset distance. By detecting whether the distance from the first surface of the electronic device to the cover component is within the preset distance at different locations by one or more sensors 12, the separation level of the cover component separating from the first surface of the electronic device may be determined according to the parameter at different locations. In addition, the sensor 12 may be formed of other components, such as a camera, a distance sensor or an ambient light sensor, or the like. The construction of the sensor 12 is not limited thereto, as long as the separation level of the cover component separating from the first surface (the front surface or the back surface) of the electronic device can be detected. For example, in a case in which the sensor 12 is formed of the camera, it is determined whether the distance from the cover component to the first surface of the electronic device is within the predetermined distance according to the brightness of the image photographed by the camera, so that the separation level of the cover component separating from the first surface of the electronic device is detected. In addition, in a case in which the sensor 12 is formed of the distance sensor, the separation level of the cover component separating from the first surface of the electronic device is detected according to the distance from the cover component to the first surface of the electronic device which is detected by the distance sensor.

Referring to FIG. 2, the sensor 12A and the sensor 12B detect the separation level of the cover component separating from the front surface of the electronic device 1 in which the display is arranged. Particularly, in a case in which the sensor 12A and the sensor 12B detect that the distance from the cover component to the display 11 is within a predetermined distance, according to the parameter obtained by the sensor 12A and the sensor 12B, it may be determined that the cover component is not opened. In addition, in a case in which the sensor 12A does not detect that the distance from the cover component to the display 11 is within a predetermined distance and the sensor 12B detects that the distance from the cover component to the display 11 is within a predetermined distance, according to the parameter obtained by the sensor 12A and the sensor 12B, it may be determined that the upper right cover of the cover component is opened. In addition, in a case in which the sensor 12A and the sensor 12B do not detect that the distance from the cover component to the display 11 is within a predetermined distance, according to the parameter obtained by the sensor 12A and the sensor 12B, it may be determined that the cover component is opened completely.

In Step S2, first display content to be displayed on a display is determined, according to the parameter.

Particularly, the separation level of the cover component separating from the first surface of the electronic device may be determined according to the parameter obtained in Step S1, so as to determine the first display content to be displayed on the display 11, corresponding to the separation level of the cover component separating from the first surface of the electronic device.

Particularly, in the diagram shown in FIG. 3, the display content to be displayed on the display 11 is controlled according to the parameter obtained by the sensor 12A and 12B arranged as shown in FIG. 2. The parameter A obtained by the sensor 12A indicates whether the distance from the cover component to the display 11 is within the predetermined distance at the locations that can be detected by the sensor 12A. Similarly, the parameter B obtained by the sensor 12B indicates whether the distance from the cover component to the display 11 is within the predetermined distance at the locations that can be detected by the sensor 12B.

In the embodiment of the present disclosure, optionally, Step S2 includes: determining a display region of the display, according to the parameter; and determining the first display content to be displayed on the display, based on the determined display region.

Particularly, referring to FIG. 3, the controller 13 determines a display region of the display 11, according to the parameter obtained by the sensor 12A and 12B. For example, in a case in which the parameter A and the parameter B indicate that the distance from the cover component to the display 11 is within the predetermined distance, it is determined that the cover component is not opened. At this time, as shown in FIG. 3, the display region of the display 11 is not set. In addition, in a case in which the parameter A indicates that the distance from the cover component to the display 11 is not within the predetermined distance and the parameter B indicate that the distance from the cover component to the display 11 is within the predetermined distance, the controller 13 determines that the upper right corner of the cover component is opened. At this time, as shown in FIG. 3, the display region of the display 11 is set to the upper right corner and corresponds to the location where the cover component is opened. In addition, in a case in which the parameter A and the parameter B indicate that the distance from the cover component to the display 11 is not within the predetermined distance, the controller 13 determines that the cover component is opened completely. At this time, as shown in FIG. 3, the display region of the display 13 is determined to be the whole displayable region of the display 11. Since the display is done only at the determined display region, the power consumption of the display 11 can be decreased.

After determining the display region of the display 11, the first display content to be displayed on the display 11 is determined based on the determined display region. Particularly, the controller 13 determines a display object contained in the first display content to be displayed on the display 11, a location and a size of the display object, according to an area and a location of the determined display region. The display content is displayed in the display 11 which includes one or more display objects, and the controller can also control the display manner of the display object, such as the location, the size, or the like. Therefore, the controller 13 can determine the first display content corresponding to the area and the location of the display region, by controlling the display object, the location and the size of the display object included in the first display content displayed on the display 11.

For example, as shown in FIG. 3, in a case in which the display region of the display 11 is set to be at the upper right corner and corresponds to the location where the cover component is opened, since the area of the display region is small, the controller 13 only sets one display object, an icon indicating the time. In addition, since the display region is at the upper right corner of the display unit, in order to make sure that the user can see with his/her eyes, the location of the display object is set to be the location where the cover component is opened. In addition, the controller can set the size of the display object included in the first display content properly, according to the area of the display region, so as to facilitate the user to check. For example, when the size of the display object is set to be too small, it is difficult for the user to see information indicated by the object, such as the time or the like, with his/her eyes. When the size of the display object is set to be too large, the range of the display object comprised in the first display content may go beyond the display region, so that the display object cannot be displayed as a whole in the display region.

Referring to FIG. 3, in a case in which the display region of the display 11 is determined to be the whole displayable region of the display 11, the controller 13 can set the number of display objects contained in the first display content according to the area of the display region. In FIG. 3, one display object is shown, but optionally more display objects are shown in order to display more information. In addition, the controller 13 sets the display object included in the first display content to be at the middle location of the whole displayable region according to the location of the display region.

In addition, in a case in which the sensor 12 is formed of other component so that other parameter is detected, for example, the distance from the front surface of the electronic device to the cover component detected by the distance sensor, the first display content can be determined according to the parameter. Particularly, as described above, the display region, the number of the display objects included, the location and the size of the display objects, or the like may be also determined according to the detected other parameter, so that the first display content is determined corresponding to the separation level of the cover component separating from the first surface of the electronic device.

In addition, in a case in which one sensor 12 comprising multiple sensing units or capable of sensing multiple location information is arranged, parameter on different locations can be also detected. Therefore, the controller 13 may control the first display content properly according to the parameter obtained by the single sensor 12.

In addition, in the above description, referring to FIGS. 2 and 3, it is shown that the separation level of the cover component separating from the front surface of the electronic device is detected by the sensor 12, and the controller 13 determines the first display content to be displayed on the display 11 according to the parameter obtained by the sensor 12. However, in the embodiment of the present disclosure, the sensor 12 may also detect the separation level of the cover component separating from the back surface of the electronic device to obtain the parameter. For example, the cover component is a cover component covering the back casing, for example, the keyboard, the support plate, or the like. The sensor 12 is operative to detect the separation level of the cover component separating from the back surface of the electronic device to obtain the parameter. At this time, the parameter indicates, for example, whether the distance from the cover component to the back casing of the electronic device is within the predetermined distance, or the distance from the cover component to the back casing of the electronic device.

In a case in which the sensor 12 detects the separation level of the cover component separating from the back surface of the electronic device, the controller determines the first display content to be displayed on the display 11 according to the parameter. At this time, optionally, the interactive content is displayed by the display 11 according to the separation level of the cover component separating from the back surface of the electronic device. For example, in a case in which the keyboard covering the back casing is attached to the back casing of the electronic device completely, a mark for indicating the attachment is displayed on the display 11. In addition, in a case in which the keyboard is detached from the back casing of the electronic device, a mark for showing the keyboard being detaching from the back casing is displayed on the display 11 to alert the user. For another example, in a case in which the cover component is formed of a support plate, the relative angel between the support plate and the back casing of the electronic device is computed according to the parameter of the sensor 12 so that the display 11 displays the relative angle.

The examples in which the first display content is controlled according to the separation level of the cover component separating from the back surface of the electronic device is not limited thereto, and arbitrary information can be displayed as long as the user experience can be improved. For example, it is also possible to display the interactive information on the display 11 according to the separation level of the cover component separating from the back surface of the electronic device. For example, in a case in which the keyboard is detached from the back casing of the electronic device, weather information is displayed on the display 11. Then, if the user wants to check the weather information, he/she only needs to detach the keyboard from the back casing and the user experience is improved.

Optionally, in the embodiment of the present disclosure, in order to improve the accuracy of the detection of the cover component separating from the first surface of the electronic device, more sensors 12 are arranged. For example, referring to FIG. 4, four sensors, the sensor 12-1, the sensor 12-2, the sensor 12-3 and the sensor 12-4 are arranged, therefore, more states, for example, the upper right corner being opened, the lower right corner being opened, the right half part opened, completely opened, or the like, about the separation level of the cover component separating from the first surface of the electronic device can be detected. Since the separation level of the cover component separating from the first surface of the electronic device can be determined more accurately, correspondingly the first display content to be displayed on the display 11 can be controlled more properly according to the parameter. However, with the increasing of the numbers of the sensors 12, the power consumption is increased too, and the processes for processing the parameter obtained by the sensor 12 are increased as well.

Therefore, in the embodiment of the present disclosure, the multiple sensors 12 are divided into at least two groups of sensors, and the at least two groups of sensors are given different priorities. In the step of determining the display region of the display 11 according to the parameter, optionally, the current priority is initialized to be the highest priority, and the display region of the display 11 is determined, using the parameter generated by sensors in a group of sensors 12 with a priority higher than or equal to the current priority. If the display region of the display 11 cannot be determined, the controller 13 repeats the following process until the display region of the display 11 can be determined: decreasing the current priority, and determining the display region of the display 11, using the parameter generated by sensors 12 in a group of sensors with a priority higher than or equal to the decreased current priority.

For example, in a case in which the cover component is formed of a protection cover, normally, the left side of the protection cover is connected with the electronic device so that the protection cover cannot be opened from the left side. Of course, according to the user's habits, the protection cover may be also formed so as not to be opened from the upper side or the right side. In FIG. 4, the sensors 12-2 and 12-4 are divided into a group of sensors with the high priority, and the sensors 12-1 and 12-3 are divided into a group of sensors with the low priority. Of course, with the increasing of the number of the sensors, or different application scenarios, the sensors may be divided properly into more groups, and more priorities may be given to the sensors.

At this time, firstly, the controller 13 determines the display region of the display 11 according to the parameter obtained by the sensor 12 in the group of sensors with the high priority. If the sensors 12-2 and 12-44 in the group of sensors with the high priority detect that the distance from the cover component to the display 11 is within the predetermined distance, it may be considered as the cover component not being opened, and no display region is set. If the sensor 12-2 detects that the distance from the cover component to the display 11 is within the predetermined distance, in a case that the sensor 12-4 detects that the distance from the cover component to the display 11 is not within the predetermined distance, it may be determined that the lower right corner of the cover component is opened, and the display region is set to be at the lower right corner. Similarly, if the sensor 12-2 detects that the distance from the cover component to the display 11 is not within the predetermined distance, and the sensor 12-4 detects that the distance from the cover component to the display 11 is within the predetermined distance, it may be determined that the upper right corner is opened, and the display region is set to be at the upper right corner.

However, if the sensors 12-2 and 12-4 in the group of sensors with the high priority detect that the distance from the cover component to the display 11 is not within the predetermined distance, the controller 13 cannot determine whether the right half part of the cover component is opened or the cover component is completely opened. At this time, the controller 13 also uses the parameter obtained by the sensor 12 in the group of sensors with the high priority to determine the display region of the display unit 11. If the sensors 12-2 and 12-4 in the group of sensors with the high priority detect that the distance from the cover component to the display 11 is not within the predetermined distance, when the sensor 12-1 or 12-3 in the group of sensors with the low priority detects that the distance from the cover component to the display 11 is within the predetermined distance, it may be determined that the right half part of the cover component is opened, so that the display region is set to be the right half part of the display 11. In addition, if the sensors 12-2 and 12-4 in the group of sensors with the high priority determine that the distance from the cover component to the display 11 is not within the predetermined distance, when the sensors 12-1 and 12-3 in the group of sensors with the low priority detect that the distance from the cover component to the display 11 is within the predetermined distance, it may be determined that the cover component is opened completely, so that the display region is set to be the whole displayable region of the display 11.

Therefore, in the embodiment of the present disclosure, in a normal mode, the sensors 12-1 and 12-3 may be turned off. When the sensors 12-2 and 12-4 in the group of sensors with the high priority detect that the distance from the cover component to the display 11 is not within the predetermined distance, the sensors 12-1 and 12-3 are turned on to obtain the parameter, thereby the power consumption can be saved. Also, in the normal mode, the display region is determined only by using the parameter obtained by the sensors 12-2 and 12-4 in the group of sensors with the high priority, the detected information amount is decreased and the process for determining the display region becomes simple.

In addition, in a case in which more sensors are arranged so that they are divided into groups of sensors with more than three different priorities, if the display region of the display 11 cannot be determined, the controller 13 repeats the following process until the display region of the display 11 can be determined: decreasing the current priority, and determining the display region of the display 11, using the parameter generated by sensors 12 in a group of sensors with a priority higher than or equal to the decreased current priority.

Back to FIG. 5, in Step S3, the first display content is displayed using the display. Particularly, normally, the display 11 shown in FIG. 11 displays the display content in the whole displayable region of the display. However, as described above, in the embodiment of the present disclosure, the first display content determined corresponding to the separation level of the cover component separating from the electronic device is displayed. The display object contained in the first display content, the location and the size of the display object, or the like, are determined according to the separation level of the cover component separating from the electronic device.

With the display control method according to the present disclosure, the sensor for detecting the separation level of the cover component, such as the protection cover, or the like, separating from the first surface of the electronic device, generates the parameter, and the display content to be displayed on the display 11 is determined based on the parameter. Thereby, even if the cover attachment is arranged in the electronic device 1, the user's operation won't become troublesome, and the user experience is improved. For example, when the user wants to check the time or check whether there is the notification information, since the case in which a corner of the protection cover covering the display 11 is turned over can be detected and the time or the notification information can be displayed at the corresponding corner based on such case, the user only needs to uncover the corner of the protection cover. In addition, for example, in a case in which the keyboard covering the back casing is attached to the back casing of the electronic device, the mark for indicating the attachment is displayed on the display 11. When the keyboard is detached from the back casing of the electronic device, the mark indicating the keyboard being detached from the back casing is displayed on the display 11 to alert the user, so that the user experience is improved.

Those skilled in the art shall appreciate that the units and the steps described with reference to the embodiments of the present disclosure may be realized in hardware, computer software or the combination of both. The software module may be embodied in any form of computer storage medium. In order to describe the exchangeability between the hardware and the software clearly, the construction and the steps of the examples have been described functionally in general in the above description. Whether the functions being performed in hardware or software depends on the particular application of the technical solution and the design restrict condition. Those skilled in the art may apply different methods to each specific application to realize the described function, and such implementation shall not be considered as departing from the scope of the present disclosure.

The implementations of the present disclosure have been described above in detail. Nevertheless, those skilled in the art should understand that various modifications, combinations, partial combinations and alternations may be made to the disclosure without departing from the scope and the spirit of the present disclosure, and such modifications shall fall within the scope of the appended claims and their equivalents.

The invention claimed is:

1. A display control method for an electronic device, comprising:
    obtaining a parameter that represents a separation level of a cover component separating from a first surface of the electronic device by one or more sensors arranged in the electronic device;
    determining a first display content to be displayed on a display according to the parameter, wherein the first display content comprises a display object; and
    displaying the first display content by the display, wherein a location of the display object is set to be the location where the cover component is opened, and/or wherein when the cover component is completely opened, the location of the display object is the whole displayable region of the display.

2. The display control method of claim 1, wherein the step of determining a first display content to be displayed on a display according to the parameter comprises:
    determining a display region of the display according to the parameter; and
    determining the first display content to be displayed on the display based on the determined display region.

3. The display control method of claim 2, wherein in the step of determining the first display content to be displayed on the display based on the determined display region, the display object contained in the first display content to be displayed on the display and the location and a size of the display object are determined according to an area and a location of the determined display region.

4. The display control method of claim 2, wherein
    the multiple sensors are divided into at least two groups of sensors which are given different priorities,
    in the step of determining a display region of the display according to the parameter, the current priority is initialized to be the highest priority and the display region of the display is determined using the parameter generated by sensors in a group of sensors with a priority higher than or equal to the current priority; and
    if the display region of the display cannot be determined, the following process is repeated until the display region of the display can be determined: decreasing the current priority and determining the display region of the display using the parameter generated by sensors in a group of sensors with a priority higher than or equal to the decreased current priority.

5. The display control method of claim 1, wherein the cover component is a peripheral attachment or the electronic device comprises the cover component.

6. The display control method of claim 1, wherein the separation level of the cover component separating from the first surface of the electronic device is detected according to a distance from the cover component to the first surface of the electronic device.

7. An electronic device, comprising:
    a display operative to display content;
    one or more sensors operative to detect a parameter which represents a separation level of a cover component separating from a first surface of the electronic device; and
    a controller operative to determine first display content to be displayed on the display, according to the parameter, and to control the display to display the first display content, wherein the first display content comprises a display object, and wherein a location of the display object is set to be the location where the cover component is opened, and/or wherein when the cover component is completely opened, the location of the display object is the whole displayable region of the display.

8. The electronic device of claim 7, wherein the controller is operative to determine a display region of the display according to the parameter and to determine the first display content to be displayed on the display based on the determined display region.

9. The electronic device of claim 8, wherein the controller is operative to determine the display object contained in the first display content to be displayed on the display and the location and a size of the display object according to an area and a location of the determined display region.

10. The electronic device of claim 8, wherein
    the multiple sensors are divided into at least two groups of sensors which are given different priorities;
    the controller is operative to initialize the current priority to be the highest priority to determine the display region of the display using the parameter generated by sensors in a group of sensors with a priority higher than or equal to the current priority; and
    if the display region of the display cannot be determined, the controller repeats the following process until the display region of the display can be determined: decreasing the current priority, and determining the display region of the display, using the parameter generated by sensors in a group of sensors with a priority higher than or equal to the decreased current priority.

11. The electronic device of claim 7, wherein the cover component is a peripheral attachment or the electronic device comprises the cover component.

12. The electronic device of claim 7, wherein the separation level of the cover component separating from the first surface of the electronic device is detected according to a distance from the cover component to the first surface of the electronic device.

* * * * *